US010684496B2

(12) United States Patent
Jouard et al.

(10) Patent No.: US 10,684,496 B2
(45) Date of Patent: Jun. 16, 2020

(54) ELECTRONIC FRAME FOR AN OPTICAL DEVICE AND A METHOD FOR OPERATING SAID ELECTRONIC FRAME

(71) Applicant: Essilor International, Charenton-le-Pont (FR)

(72) Inventors: Ludovic Jouard, Charenton le Pont (FR); Cedric Gilbert, Charenton le Pont (FR)

(73) Assignee: Essilor International, Charenton-Le-Pont (FR)

( * ) Notice: Subject to any disclaimer, the term of this patent is extended or adjusted under 35 U.S.C. 154(b) by 124 days.

(21) Appl. No.: 15/762,807

(22) PCT Filed: Sep. 8, 2016

(86) PCT No.: PCT/FR2016/052243
§ 371 (c)(1),
(2) Date: Mar. 23, 2018

(87) PCT Pub. No.: WO2017/051091
PCT Pub. Date: Mar. 30, 2017

(65) Prior Publication Data
US 2018/0284487 A1    Oct. 4, 2018

(30) Foreign Application Priority Data
Sep. 24, 2015    (EP) .................................... 15306489

(51) Int. Cl.
*G02C 11/00* (2006.01)
*G02C 5/14* (2006.01)
(Continued)

(52) U.S. Cl.
CPC ................ *G02C 11/10* (2013.01); *G02C 5/14* (2013.01); *G02C 5/22* (2013.01); *G02C 7/081* (2013.01); *G02C 7/083* (2013.01); *G02C 7/101* (2013.01)

(58) Field of Classification Search
CPC .......... G02C 11/10; G02C 7/083; G02C 5/14; G02C 5/229
(Continued)

(56) References Cited

U.S. PATENT DOCUMENTS 6,622,012 B2 * 9/2003 Bilotti ................ H03K 17/9517
307/116
7,175,272 B2 * 2/2007 Lee .......................... G02C 9/04
351/47
(Continued)

FOREIGN PATENT DOCUMENTS

CN    103095273 A    5/2013
FR    2 926 882 A1   7/2009

OTHER PUBLICATIONS

FR 2926882; Published Jul. 31, 2009 wtih Machine Translation.*
(Continued)

*Primary Examiner* — Zachary W Wilkes
(74) *Attorney, Agent, or Firm* — Oblon, McClelland, Maier & Neustadt, L.L.P.

(57) ABSTRACT

An electronic frame for an optical device, including: a frame surface element configured to house, at least in part, at least one lens, and connected to at least one temple by respective ends; a circuit controlling operation of at least one electronic component; at least one magnetic or electric field transmitter and one magnetic or electric field sensor, at least one of the sensor or transmitter mounted to be movable relative to one another between first and second positions, the sensor configured to detect a first field direction and a first field value emitted by the transmitter in the first position, and a second field direction and a second field value emitted by the transmitter in the second position, to generate a first position signal or a second position signal towards the control circuit to prompt a response from the control circuit towards the at least one electronic component.

12 Claims, 1 Drawing Sheet

(51) Int. Cl.
*G02C 5/22* (2006.01)
*G02C 7/08* (2006.01)
*G02C 7/10* (2006.01)

(58) Field of Classification Search
USPC .......................................... 351/158, 111, 153
See application file for complete search history.

(56) References Cited

U.S. PATENT DOCUMENTS

| | | | |
|---|---|---|---|
| 9,380,374 B2* | 6/2016 | Sprague | G02C 11/06 |
| 9,482,882 B1* | 11/2016 | Hanover | G02C 11/10 |
| 2008/0129953 A1* | 6/2008 | Blum | G02C 5/143 |
| | | | 351/153 |
| 2010/0110368 A1 | 5/2010 | Chaum | |
| 2012/0176580 A1* | 7/2012 | Sonsino | G02C 7/14 |
| | | | 351/158 |
| 2013/0088288 A1 | 4/2013 | Maerz et al. | |
| 2016/0087621 A1 | 3/2016 | Maerz et al. | |

OTHER PUBLICATIONS

FR-2926882; Karciauskas with Human Translation; Jul. 31, 2009 (Year: 2009).*
International Search Report dated Nov. 24, 2016 in PCT/FR2016/052243 filed Sep. 8, 2016.
Office Action dated Dec. 24, 2018 in Chinese Patent Application No. 201680056782.8, 9 pages (submitting English translation only).

* cited by examiner

ELECTRONIC FRAME FOR AN OPTICAL DEVICE AND A METHOD FOR OPERATING SAID ELECTRONIC FRAME

The invention relates to an electronic frame.

It may be a question, by way of nonlimiting example, of a frame including electronic components, in order to obtain an optical device, for example a pair of spectacles equipped with correcting eyeglasses, for example with correcting lenses or eyeglasses such as variable-amplitude ophthalmic cells the amplitude of which is controlled via an electronic circuit, or indeed even with simple eyeglasses, whether tinted or not.

An electronic frame for an optical device of the spectacles type usually includes:
 a front element comprising an accommodating housing for at least one lens;
 at least one temple connected to the front element via respective front-element and temple ends; and
 at least one electronic component.

The term "front" will be understood to mean a set of elements of a frame for an optical device, the assembly being intended to be placed in front of a face when the frame is worn by a user.

Such electronic frames consume power to operate.

The invention allows whether or not these electronic frames are being worn to be detected, in particular (but not exclusively) in order to limit the power consumption of the electronic frame when the spectacles-type optical device is not being used.

To this end, the invention relates to an electronic frame of the aforementioned type, which is noteworthy in that it includes at least one electric- or magnetic-field emitter and respectively one electric- or magnetic-field sensor, one at least of said sensor or emitter being mounted so as to be movable with respect to the other, between a first position and a second position, the electric- or magnetic-field sensor being able to detect a difference between:
 a first field direction and/or a first field value of the field emitted by said electric- or magnetic-field emitter in the first position, and,
 respectively, a second field direction and/or a second field value of the field emitted by said electric- or magnetic-field emitter in the second position,
so as to generate a first-position signal or a second-position signal to said control circuit, in order to cause a response of the control circuit in the direction of said at least one electronic component.

By virtue of the presence of the electric- or magnetic-field sensor and the electric- or magnetic-field emitter in the electronic frame, by virtue of the fact that one thereof is movable with respect to the other and by virtue of the operating mode thus defined, the electronic frame is equipped with means that allow its power supply to be placed on standby when it is not being worn.

Specifically, considering the second position to be equivalent to a closed position of the temples of a frame and the first position to be equivalent to an open position of the temples of a frame (position for example indicating the frame is being worn), the electric- or magnetic-field sensor is capable of detecting one or other of the positions so as to place on standby or reactivate the power supply of the control circuit.

Thus, the invention allows power to be saved and allows smart electronic frames that automatically manage their operating mode without the wearer having to intervene to be created (it is not necessary for the wearer to actuate a button to make the control circuit of the frame work).

The electronic frame according to the invention may also include the following features, separately or in combination:
 the sensor is advantageously a magnetic-field sensor and the emitter is a magnetic-field emitter;
 preferably, the electric- or magnetic-field emitter is positioned at one of the ends among the ends of the front element or of the temple and the electric- or magnetic-field sensor is positioned at the other end of the ends of the front element or of the temple;
 the respective ends of the front element and of the temple may be connected by a hinge element having an axis of rotation and said electric- or magnetic-field emitter may be positioned in the vicinity of said hinge and may be centered on said axis of rotation so that the electric- or magnetic-field emitter has a field axis that is concurrent with the axis of rotation and in a plane normal to the axis of rotation;
 the magnetic-field emitter may be a magnet of substantially cylindrical shape and said magnet may be polarized in the radial direction;
 the magnet of substantially cylindrical shape may be positioned in said hinge element and the magnet may have a flat allowing its orientation at the moment of mounting to be facilitated;
 the magnet may have a through-hole in order to accommodate a screw for fastening it to said frame;
 said electric- or magnetic-field sensor may have a detection surface and the sensor may be a sensor measuring a value of an electric or magnetic field at said detection surface in a preset measurement direction;
 in the latter embodiment, provision may be made for the preset measurement direction to be concurrent with the axis of rotation of said hinge and in a plane normal to this axis of rotation;
 lastly, said magnetic-field sensor is an analog sensor, possibly an anisotropic magnetoresistance sensor, a Hall-effect sensor, or a Reed sensor.

The invention furthermore relates to an assembly including an electronic frame, such as defined above, and a device for charging said frame, said electronic frame including a charging holder. The assembly according to the invention is noteworthy in that said control circuit is able to permit the frame to charge only if the control circuit receives a second-position signal.

Lastly, the invention relates to a method for operating a frame such as defined above. The method according to the invention is noteworthy in that, when the control circuit receives a second-position signal, said control circuit places the electronic frame on standby.

According to one advantageous implementation of an electronic frame including a plurality of electronic components, the method makes provision such that, when said control circuit receives a second-position signal, said control circuit deactivates the operation of one of the electronic components.

According to another advantageous implementation of an electronic frame for an assembly such as defined above, the method makes provision such that, when said control circuit receives a first-position signal, the control circuit prevents said electronic frame from charging.

Lastly, according to another advantageous implementation of an electronic frame for an assembly such as defined above, the method makes provision such that, when the control circuit receives a second-position signal, the control circuit permits the electronic frame to charge.

In order to allow it to be implemented, the invention is described in a manner sufficiently clear and complete in the following description that, in addition, is accompanied by drawings in which.

For the sake of clarity, only the elements useful for understanding the embodiments described have been shown.

In addition, from one embodiment to the next, references designating a given element have been reused.

Lastly, in the following description, the terms "lower", "upper", "top", "bottom", etc. are used with reference to the drawings for the sake of facilitating comprehension. They must not be understood to be limitations on the scope of the invention.

Figure 1:
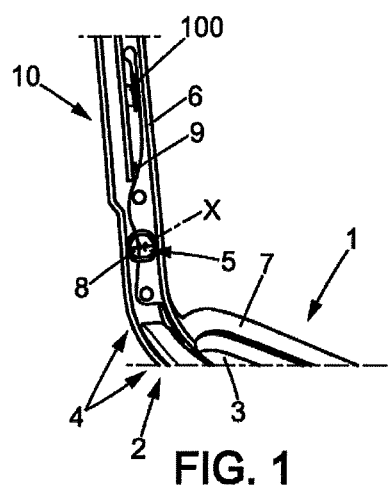
FIG. 1 is a schematic cross-sectional view of a portion of an electronic frame according to a first embodiment of the invention.

FIG. 1 shows a portion of an electronic frame 1 according to the invention.

Only the portion of the electronic frame including elements specific to the invention has been illustrated.

The electronic frame 1 includes a front element 2, partially housing a lens 3.

The illustrated lens 3 may be a lens the dimensions of which are such that it sits in front of one eye of the wearer of the electronic frame. The lens 3 may also be a "goggles" or "mask" type lens, which has dimensions such that it sits in front of both eyes of the wearer of the electronic frame.

The lens 3 is, in the context of the illustrated example, rimmed with a rim 7, the rim 7 holding the edges of the lens 3. The rim 7 belongs to the front element.

Only one portion of the front element 2 has been illustrated, this portion corresponding to an end 4 of the front element 2 in the vicinity of a hinge 5, connecting the front element 2 to a temple 6.

More precisely, the end 4 of the front element 2 and one end 10 of the temple 6 are connected together by means of the hinge 5.

The hinge 5 has an axis of rotation X that allows the temple 6 to be pivoted with respect to the front element 2 so as to place the temple 6 against the front element in the folded-down position and so as to separate the temple 6 from the front element, as far as to a separated position allowing a wearer to wear the electronic frame 1. The separated position is illustrated in FIG. 1.

Conventionally, the electronic frame 1 includes an electronic component (not shown) and a circuit for controlling the operation of the electronic component.

The electronic component may be the electronic circuit of an active lens 3, of the electrochromic lens type, which becomes tinted when a minimum light-intensity value is detected by a sensor. Such an electronic circuit and the means that allow its operation to be controlled are housed in the rim 7 of the electronic frame 1. They have however not been shown in FIG. 1 for the sake of legibility.

According to the invention, the electronic frame includes an electric- or magnetic-field emitter 8 and an electric- or magnetic-field sensor 9, respectively.

Figure 2:
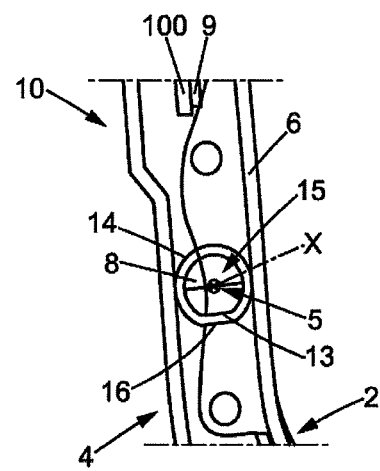
FIG. 2 is an enlargement of the cross-sectional view shown in FIG. 1.
Figure 4:
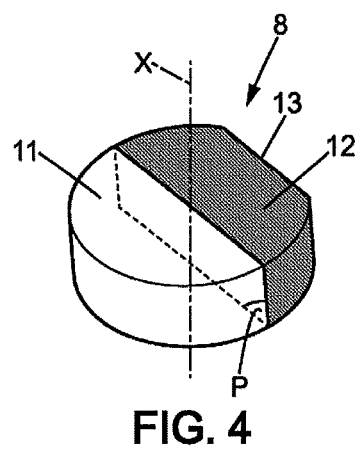
FIG. 4 is a perspective view of a magnetic-field emitter included in the frame shown in FIG. 1.

In the context of this embodiment, the electric- or magnetic-field emitter 8 is a magnetic-field emitter and more particularly a magnet 8 illustrated in FIGS. 1, 2 and 4.

Figure 3:
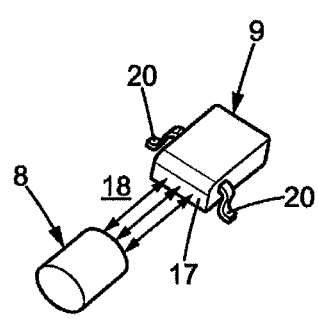
FIG. 3 is a perspective view of a magnetic-field sensor included in the frame shown in FIG. 1.

The electric- or magnetic-field sensor 9 is a magnetic-field sensor and it is illustrated in FIGS. 1 and 3.

According to the illustrated embodiment, the magnetic-field sensor 9 is positioned in the temple 6, at the temple end 10 in the vicinity of the hinge 5, whereas the magnet 8 is positioned at the end 4 of the front element 2.

In this way, the magnetic-field sensor 9 is mounted so as to be able to move with respect to the magnet 8.

Since the temple 6 is able to be moved away from or toward the front element by virtue of the hinge 5, between a separated position and a folded-down position, the magnetic-field sensor 9 may also be moved away from or toward the front element 2 between a separated position and a folded-down position of the temple 6.

In the context of the illustrated embodiment, the magnet 8 is positioned in the hinge 5 and in the extension of the axis of rotation X of the hinge 5.

In addition, the magnet 8 is held in place in the hinge.

This particular position of the magnet 8, held in place on the axis of the hinge 5, implies that the magnetic-field sensor 9, which is fastened to the temple 6, always remains the same distance from the magnet 8, but that the magnetic sensor is mounted so as to be able to rotate about the magnet 8 between a first limit position, for example corresponding to the (aforementioned) separated position of the temple 6, and a second limit position, for example corresponding to the folded-down position of the temple 6.

The magnetic-field lines emitted by the magnet do not have the same direction in the location in which the magnetic sensor 9 finds itself in the first position or second position. In addition, the magnetic-field values in the first or second position of the magnetic-field sensor are not the same, the field lines not following the path of the magnetic-field sensor during passage of the temple 6 from the separated position to the folded-down position or vice versa.

The magnetic-field sensor 9 is therefore capable of detecting, depending on whether it is in the first or second position, or indeed in intermediate positions between the first and second positions, a variation in magnetic-field value and/or magnetic-field direction.

FIGS. 1 and 2 show that the electric- or magnetic-field sensor 9 is connected to an electronic board 100 that is inserted into the temple 6, the electronic board 100 allowing the information collected by the electric- or magnetic-field sensor 9 to be processed and the processed information to be transmitted to the circuit for controlling the electronic components of the electronic frame.

The processed information may be a signal, indicating that the temple is in the position separated from the front element: the signal will then be called the first-position signal.

The signal may also indicate that the temple is in the position folded down against the front element: the signal will then be called the second-position signal.

The control circuit, in response to reception of the first-position signal, may reactivate the power supply of the electronic components of the frame if the latter was in a standby state. It may also, again in response to reception of the first-position signal, prevent a battery comprised in the spectacle frame 1 from charging, thereby guaranteeing the wearer a minimum level of safety.

The control circuit, in response to reception of the second-position signal, may briefly stop the power supply of the electronic frame, placing it in a standby state. The control circuit may also, in response to reception of the second-position signal, deactivate the operation of a single electronic element among a plurality of electronic components included in the electronic frame. It may for example be a question of:
- returning electrochromic lenses to the clear state;
- placing on standby functions monitoring ambient light level;
- placing on standby functions monitoring other electronic components such as a sensor for regulating the tint taken by an electrochromic lens, a sensor for switching from automatic mode to manual mode, etc.;
- stopping the supply of the corresponding electronic components;
- placing in standby mode a microprocessor or a microcontroller: this microcomponent will have this standby state as an option, this option allowing the microprocessor to terminate all activity with the exception of the function monitoring for a change in the signal generated by the electric- or magnetic-field sensor 9.

Thus, the transmission to the control circuit of a first-position signal or of a second-position signal causes a response of the control circuit in the direction of one or more components included in the electronic frame.

Reference will now be made to the magnet 8 used in the electronic frame according to the invention.

FIG. 4 illustrates the magnet 8: the latter is of substantially cylindrical shape, and is polarized in the radial direction.

The magnet thus has a first magnet half 11 having a first polarization, and a second magnet half 12 with a second polarization, the first and second magnet halves 11 and 12 being located on either side of an axial plane P of the magnet 8.

Moreover, the magnet 8 includes a peripheral flat 13 allowing the magnet to be correctly oriented when it is placed at the end 4 of the front element 2 of the electronic frame 1.

The magnet 8 may, for example, have a diameter of 3 mm and a height of 1 mm and be radially polarized.

The magnet may be made of NdFeB.

With such a magnet 8, the magnetic-field sensor 9 may be placed at a distance of about 5 to 8 mm from the magnet.

The end 4 of the front element 2 includes a housing 14 for accommodating the magnet 8, said housing having an aperture 15 through which the magnet is inserted and having a shape complementary to that of the magnet: the housing 14 therefore has a substantially circular cross section with an edge portion 16 that is straight, against which portion the flat 13 of the magnet is placed when the magnet 8 is inserted into the housing.

The magnet 8 has an axial through-hole (not shown), allowing the magnet 8 to be held in place in the housing 14 by screwing.

Reference will now be made to the magnetic-field sensor used in the context of the present embodiment.

The magnetic-field sensor is illustrated in FIG. 3.

The magnetic-field sensor 9 includes two pins 20 for fastening to the electronic board 100. It is a question of a magnetic-field sensor 9 that has a detection surface 17, and that measures the value of a magnetic field, originating from a magnetic-field emitter 8, at the detection surface in a preset measurement direction 18 (double-headed arrows in FIG. 3).

The magnetic-field sensor 9 is configured to possess two output states, a first state corresponding to the first-position signal and a second state corresponding to the second-position signal.

More precisely, the first output state of the sensor is generated when the measured magnetic field is higher than a certain value (which may be fixed or parameterizable) and the second output state of the sensor is generated if the measured field is lower than this value.

In the embodiment of a magnetic sensor, the threshold at which the magnetic sensor switches from the first state to the second state is of the order of one millitesla (mtesla).

In the context of this embodiment, provision is made for the preset measurement direction 18 to be concurrent with the axis of rotation X of the hinge 5 and in a plane normal to this axis of rotation X.

As the magnet 8 is placed coaxially to the axis of rotation X of the hinge, the magnet 8 has a magnetic-field axis that is concurrent with the axis of rotation X and normal to the axis of rotation of the hinge 5. Thus the magnetic-field sensor 9 may sense variations in the magnetic field emitted by the magnet 8.

It will be noted that the axis of polarization of the magnet 8 is aligned and coplanar with the axis of the sensor when the temple is in the folded-down position. Such a configuration leads the state of the sensor to change when the temple 6 is half open (substantially halfway between the folded-down position and the separated position).

The particular orientations and placements of the magnetic-field emitter and sensor 8 and 9, as described above, allow the system to tolerate variations in the value of the magnetic field of the magnet and variations in the distance between the axis of rotation and the center of the magnetic-field sensor.

Specifically, this embodiment guarantees:
- that the minimum magnetic field measured by the sensor is almost zero (scalar product of two orthogonal vectors); and
- that the maximum magnetic field is measured at an angular position of the temple 6 of 90° with respect to the magnetic axis.

Furthermore, this is true whatever the magnetic-field value and the distance between the magnetic-field sensor 9 and the axis of rotation X.

It will be noted that any other arrangement of the magnetic-field emitter or receiver would create a dependency between the value of the minimum field, the angular position of the minimum and maximum fields with respect to the position of the magnet 8, the distance between the magnetic-field sensor and the magnet and the value of the magnetic field.

By way of example, the magnetic-field sensor 9 may be an anisotropic magnetoresistance sensor (AMR sensor).

It could also be another type of sensor, such as an analog Hall-effect sensor or indeed an analog Reed sensor.

In the described embodiment, the magnetic-field sensor acts as a detector of whether the electronic frame 1 is being worn: a folded-down temple indicates that the piece of equipment is not being worn.

In another embodiment (not illustrated) provision could be made for the electronic frame 1 to be associated with an electronic-frame charger 1.

In such a case, the electronic frame would be equipped with a charging holder (not illustrated).

Provision is made, by virtue of the invention, for the control circuit to be able to take into consideration the signal emitted by the electronic board 100, with regard to permitting or not the frame to charge.

Specifically, and as has already been mentioned above, it is in fact dangerous to charge the electronic frame while it is being worn by a wearer, and any embodiment that would allow this to occur is a no-go.

Thus, if the control circuit takes into consideration the nature of the signal emitted by the electronic board in response to the indications of the magnetic-field sensor (or electric-field sensor in another embodiment) 9, it is possible to prevent the electronic frame from charging if the temples of the frame are open (first-position signal emitted by the electronic board in the direction of the control circuit).

Thus, when the second-position signal is emitted by the electronic board 100 following reception of the information relayed by the magnetic-field sensor (or electric-field sensor in another embodiment) 9, then the control circuit permits the electronic frame to charge.

It will be understood from the above description how the invention allows an electronic frame that is not being used to be easily placed on standby automatically.

As an alternative to the described embodiment, it is possible to envision placing the magnetic- or electric-field emitter in one temple, the magnetic- or electric-field sensor, respectively, in contrast being placed in the second temple. Thus, the sensor receives a non-zero field only when the temples are in a second position, the sensor and emitter then being close together.

The embodiments according to the invention that have just been described have many advantages, among which:
- Implementation is very simple: if it is assumed that an electronic board is already present in a temple, it is enough to add a sensor thereto and to add a magnet to the electronic frame. It is necessary, in such a case, for the board to be capable of managing the signal of the sensor in a specific standby configuration, specific to a particular type of microcontroller.
- The system is inexpensive.
- The operation of such a frame is very reliable because the method requires no mechanical contact.
- Its bulk is very small.
- The frame is robust (the system is insensitive to variations related to the repeatability of the assembly processes or characteristics of the elements).
- The emitter/sensor system allows seal-tight electronic devices to be produced easily.
- A low power consumption.
- In the case of a magnetic-field emitter, it is possible to detect whether the temples are open/closed without using any electronic element in the element incorporating the magnet, thus allowing all the electronics to be grouped together in one temple, or in the front element of the frame.

The invention claimed is:

1. An electronic frame for an optical device, the electronic frame comprising:
    a front frame element configured to house at least partially at least one lens, the front frame element being connected to at least one temple via respective ends of the front frame element and of the temple;
    a control circuit configured to control an operation of at least one electronic component; and
    at least one magnetic-field emitter and respectively one magnetic-field sensor, one at least of the sensor or emitter being mounted to be movable with respect to the other, between a first position and a second position, the magnetic-field sensor configured to detect a difference between:
        a first field direction and/or a first field value of the field emitted by the magnetic-field emitter in the first position, and
        respectively, a second field direction and/or a second field value of the field emitted by the magnetic-field emitter in the second position,
    to generate a first-position signal or a second-position signal to the control circuit, to cause a response of the control circuit in a direction of the at least one electronic component,
    the respective ends of the front frame element and of the temple being connected by a hinge element having an axis of rotation, the magnetic-field emitter being a magnet held in place in the hinge and the magnetic-field sensor being fastened to the temple so that the magnetic-field sensor always remains at a same distance from the magnet.

2. The electronic frame as claimed in claim 1, wherein the magnetic-field emitter is positioned at one of the ends among the ends of the front frame element or of the temple and the magnetic-field sensor is positioned at the other end of the ends of the front frame element or of the temple.

3. The electronic frame as claimed in claim 1, wherein the magnet is polarized in a radial direction.

4. The electronic frame as claimed in claim 1, wherein the magnet includes a through-hole to accommodate a screw, allowing the magnet to be fastened to the electronic frame.

5. The electronic frame as claimed in claim 1, wherein the magnetic-field sensor includes a detection surface and the magnetic-field sensor is a sensor measuring a value of a magnetic field at the detection surface in a preset measurement direction.

6. The electronic frame as claimed in claim 5, wherein the preset measurement direction is concurrent with the axis of rotation of the hinge and in a plane normal to the axis of rotation.

7. The electronic frame as claimed in claim 1, wherein the magnetic-field sensor is an analog sensor, the sensor being an anisotropic magnetoresistance sensor, a Hall-effect sensor, or a Reed sensor.

8. An assembly comprising:
    the electronic frame as claimed in claim 1; and
    a device configured to charge the electronic frame, the electronic frame including a charging holder,
    wherein the control circuit is configured to permit the frame to charge only if the control circuit receives a second-position signal.

9. A method for operating an electronic frame that includes
    a front frame element configured to house at least partially at least one lens, the front frame element being connected to at least one temple via respective ends of the front frame element and of the temple,
    a control circuit configured to control an operation of at least one electronic component, and at least one magnetic-field emitter and respectively one magnetic-field sensor, one at least of the sensor or emitter being mounted to be movable with respect to the other, between a first position and a second position, the magnetic-field sensor configured to detect a difference between: a first field direction and/or a first field value of the field emitted by the magnetic-field emitter in the first position, and respectively, a second field direction and/or a second field value of the field emitted by the magnetic-field emitter in the second position, to generate a first-position signal or a second-position signal to the control circuit, to cause a response of the control circuit in a direction of the at least one electronic component, the respective ends of the front frame element and of the temple being connected by a hinge element having an axis of rotation, the magnetic-field emitter being a magnet held in place in the hinge and the magnetic-field sensor being fastened to the temple so that the magnetic-field sensor always remains at a same distance from the magnet, the method comprising:

when the control circuit receives a second-position signal, placing, by the control circuit, the electronic frame on standby.

10. The method as claimed in claim 9, wherein the electronic frame includes a plurality of electronic components, the method further comprising:

when the control circuit receives a second-position signal, deactivating, by the control circuit, operation of one of the electronic components.

11. A method for operating an electronic frame for an assembly that includes the electronic frame and a device for charging the electronic frame, the electronic frame including a charging holder, a front frame element configured to house at least partially at least one lens, the front frame element being connected to at least one temple via respective ends of the front frame element and of the temple, a control circuit configured to control an operation of at least one electronic component, and at least one magnetic-field emitter and respectively one magnetic-field sensor, one at least of the sensor or emitter being mounted to be movable with respect to the other, between a first position and a second position, the magnetic-field sensor configured to detect a difference between: a first field direction and/or a first field value of the field emitted by the magnetic-field emitter in the first position, and respectively, a second field direction and/or a second field value of the field emitted by the magnetic-field emitter in the second position, to generate a first-position signal or a second-position signal to the control circuit, to cause a response of the control circuit in a direction of the at least one electronic component, the respective ends of the front frame element and of the temple being connected by a hinge element having an axis of rotation, the magnetic-field emitter being a magnet held in place in the hinge and the magnetic-field sensor being fastened to the temple so that the magnetic-field sensor always remains at a same distance from the magnet, wherein the control circuit is configured to permit the frame to charge only if the control circuit receives a second-position signal, the method comprising:

when the control circuit receives a first-position signal, preventing, by the control circuit, the electronic frame from charging.

12. The method as claimed in claim 11, further comprising:

when the control circuit receives a second-position signal, permitting, by the control circuit, the electronic frame to charge.

\* \* \* \* \*